Feb. 6, 1934.  G. H. CURTISS  1,946,194
TRAILER COUPLER
Filed Nov. 23, 1929   3 Sheets-Sheet 1

INVENTOR
GLENN H. CURTISS.
BY
ATTORNEY

Feb. 6, 1934.   G. H. CURTISS   1,946,194
TRAILER COUPLER
Filed Nov. 23, 1929   3 Sheets-Sheet 2
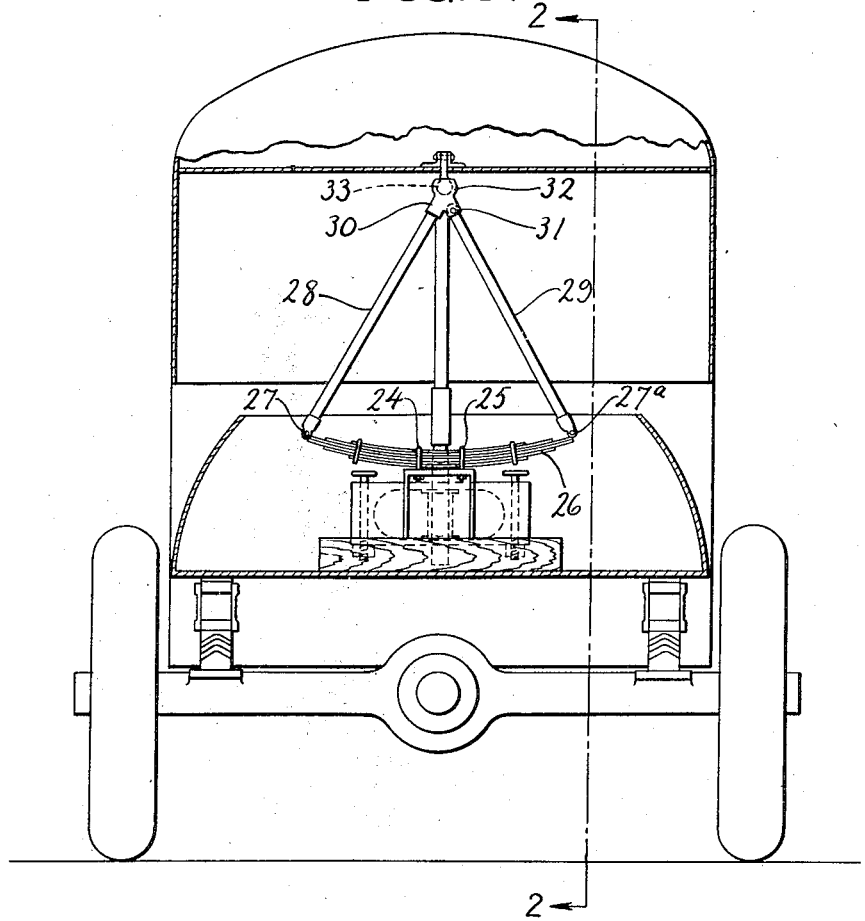
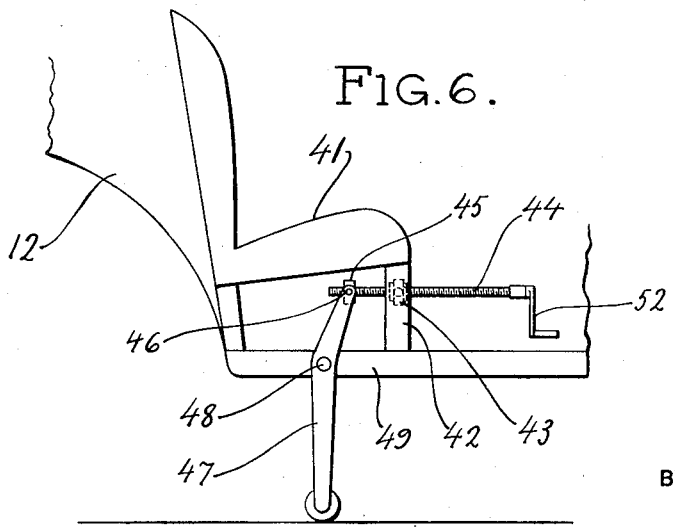
INVENTOR
GLENN H. CURTISS.
BY
ATTORNEY Feb. 6, 1934.  G. H. CURTISS  1,946,194
TRAILER COUPLER
Filed Nov. 23, 1929   3 Sheets-Sheet 3

INVENTOR
GLENN H. CURTISS,
BY
ATTORNEY

Patented Feb. 6, 1934

1,946,194

UNITED STATES PATENT OFFICE 1,946,194

TRAILER COUPLER

Glenn H. Curtiss, Country Club Estates, Fla.; Lena P. Curtiss, executrix of said Glenn H. Curtiss, deceased, assignor to Curtiss Aerocar Company, Inc., a corporation of Florida Application November 23, 1929
Serial No. 409,227

9 Claims. (Cl. 280—33.1)

My invention relates to means for coupling vehicles such as a trailer vehicle and a towing vehicle. It is especially adapted for use in connection with automobiles and constitutes an improvement on the invention disclosed in my prior application, Serial Number 283,881, filed June 8, 1928.

In said prior application the support of the trailer vehicle is positioned intermediate the axles of the towing vehicle and it is thus possible to obtain much better riding qualities than if the support were positioned above or rearwardly of the rear axle of the towing vehicle. However, in positioning the coupler for the trailer vehicle and the towing vehicle forward of the rear axle of the latter vehicle, the difficulties of handling the combined vehicles sometimes are increased. Thus, where the pivot between the vehicles is forward of the rear axle, there is a great tendency to cut in on the corners and in backing, the towing car has to be cramped much shorter than ordinarily and to go farther to produce a given result on the trailer vehicle.

One of the objects of this invention is the provision of a trailer vehicle having the best and easiest riding qualities;

A further object of my invention is the provision in a towing unit including a tow car and a trailer vehicle having such easy riding qualities, of means to improve the maneuvering qualities of the complete unit and to obtain more efficient and better handling qualities;

A further object is the provision in a unit comprising a towing vehicle and a trailer vehicle, of means for causing the trailer vehicle automatically to bank in the proper direction when the unit turns corners whereby any tendency to overturn due to centrifugal motion is eliminated;

A further object is the provision in a unit comprising a towing vehicle and a trailer vehicle, of means for coupling and uncoupling the two vehicles, simpler and easier of accomplishment than the coupling means heretofore suggested;

A further object of my invention is to provide an arrangement, in a unit comprising a towing vehicle and a trailer vehicle, by which more efficient braking action may be obtained;

A further object of my invention is the provision, in a towing unit including a tow car and a trailer vehicle, of means to minimize the side sway of the trailer vehicle whereby it is possible to use a narrow rear tread for said trailer unit;

A further object is the provision, in a towing unit including a towing vehicle and a trailer vehicle, of a plurality of points of attachment whereby the factor of safety is increased;

A further object is the provision in a trailer vehicle of means for supporting the vehicle exclusive of the support afforded by the towing vehicle;

Further objects will be apparent from a reading of the subjoined specification and claims and from a consideration of the drawings.

In order to explain the invention more clearly, one embodiment thereof is shown in the accompanying drawings, in which:

Fig. 3 is a vertical section taken on the line 3—3 of Fig. 2;

Fig. 6 is an elevation of a detail of the jack which is used for supporting the forward end of the trailer vehicle when the towing car is removed.

Figure 1:
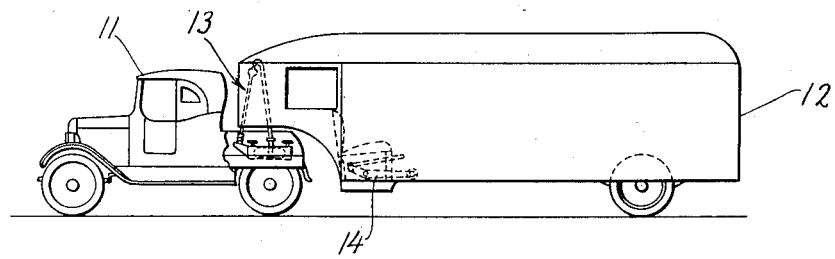
Fig. 1 is a view in elevation of a complete unit embodying one form of my invention.
Figure 2:
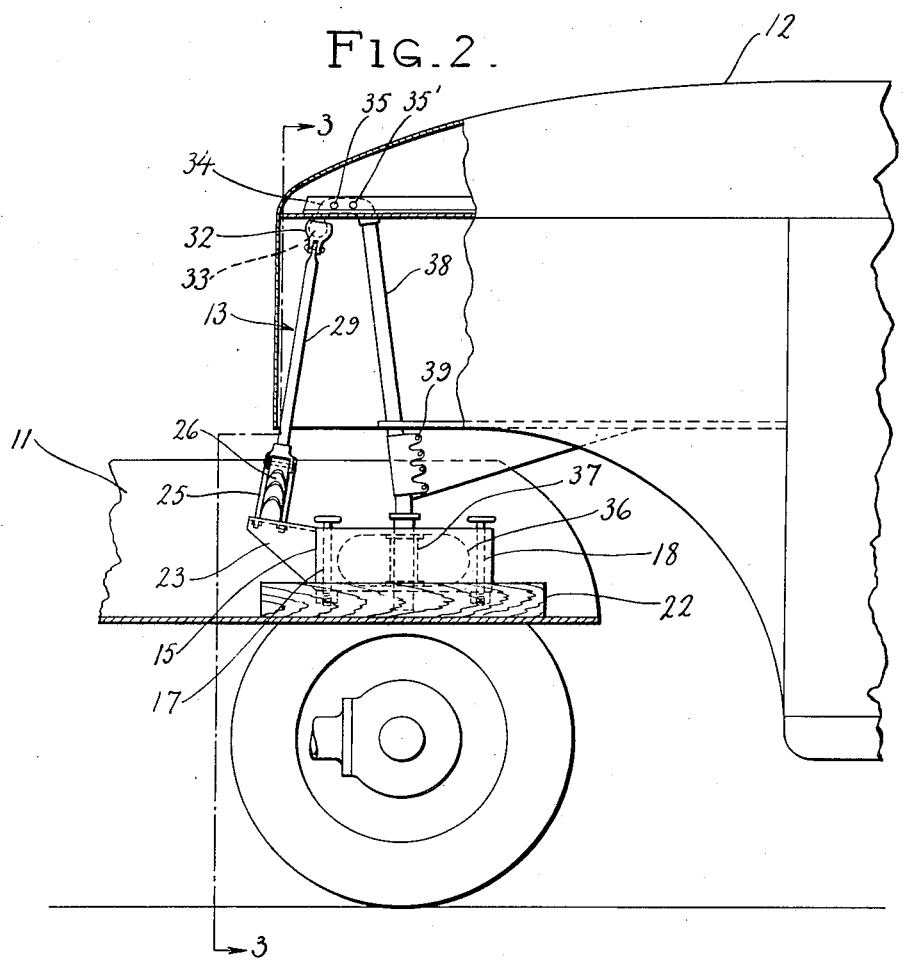
Fig. 2 is an enlarged elevation of parts of the unit shown in Fig. 1, having parts broken away and parts in section.

In general, the disclosure used for illustration of my invention comprises a towing car and a trailer and improved means for connecting the trailer to the towing car. The means for connecting the towing car and trailer comprises two separate parts. The first of these parts which includes a leaf spring, a pair of struts and a ball and socket joint, supports the forward end of the trailer on the towing vehicle and is not intended to take any of the pulling or towing strain, while the second part of the connection includes a pneumatic tube and a rod vertically slidable through the center of the tube. The latter device is provided merely for the purpose of taking the towing or pulling strains of the connection and does not provide any support for the trailer vehicle. As will be later explained more in detail, the resistance of the leaf spring is such that in turning corners it tends to oppose the full pivoting and causes the upper part of the trailer vehicle to move toward the turn and thus causes a proper bank of the trailer vehicle as it turns the corner. A jack is provided which, when retracted, folds under a seat of the trailer vehicle but when projected contacts with the ground and lifts the trailer vehicle clear of the towing vehicle.

Referring specifically to the drawings, I have shown a towing car 11 supporting a trailer vehicle 12 by means of a coupling apparatus generally designated 13. The trailer vehicle carries under a seat thereof a jack 14 by which the forward end of the trailer vehicle may be raised from the towing vehicle.

As seen more specifically in Figs. 2, 3, 4 and 5, the supporting part of the coupling unit 13 comprises a frame 15, which may be secured by bolts such as 17, 18, 19 and 21 to a block 22 secured to the towing car 11. A forward projection 23 of the frame 15 has supported thereon and secured thereto as by bolted spring clips or U bolts 24 and 25, a leaf spring 26. The leaf spring, as shown clearly in Fig. 3, is built with shorter leaves both above and below the main leaf so as to give the proper action with both up and down loads. Pivotally secured on the pivots 27 and 27ª and arranged one at each end of the leaf spring, are the two struts 28 and 29, the strut 28 carrying a fitting 30 fixedly secured to its upper end. The fitting 30 is pivoted as at 31 to the upper end of the strut 29 and carries at its upper end a socket 32 for the ball and socket joint. A ball 33 adapted to fit in the socket 32 is carried by a fitting 34 which is fixedly secured, as by bolts 35 and 35' to the top of the trailer.

As suggested, a separate mechanism is provided for taking the towing or pulling stresses of the coupling. This separate mechanism includes a pneumatic tube 36 positioned in a complementary circular recess or groove within the frame 15. The tube 36 carries within the center thereof a normally substantially vertical bearing 37 through which an upwardly extending rod 38 is inserted for sliding movement. The rod 38 is firmly secured as at 39 to the trailer vehicle at points intermediate the top and bottom thereof, and is also fastened at its top to the fitting 34.

The jack is shown generally in Fig. 1 and is shown more specifically in Fig. 6. A seat 41 in the trailer 12 has a support 42 which carries a substantially horizontal bearing 43 provided for a horizontal screw 44. The screw 44 carries at its inner end a collar 45 and pivotally secured to the collar 45 at 46 in a lever arm 47. The lever arm 47 is supported upon a pivot 48 on a longitudinal beam 49 of the frame work of the trailer vehicle 12, and carries at its lower end a caster 51 which is adapted to be projected downward to contact with the ground and to support the trailer vehicle, as shown in Fig. 6, or to be raised into inoperative relationship as shown in Fig. 1. A removable handle 52 is provided for the screw 44 and may be removed therefrom and put in any convenient place when it is not desired to use the jack.

In the operation of the combined unit it is evident that the vertical load or the support of the trailer vehicle 12 bears upon the towing vehicle through the ball and socket joint 32—33, the struts 28 and 29 and the leaf spring 26.

Due to the resiliency of the leaf spring and the relative movement at the pivot joints 27, 27ª and 31, the ball and socket joint 32—33 may be yieldingly moved toward and away from the frame 15 and thus the load of the trailer vehicle is resiliently carried by the leaf spring 26, which is supported through the frame 15 directly by the towing vehicle at a point intermediate the forward and rear axle thereof. The rod 38, the bearing 37 and the tube 36 carry no part of the vertical load inasmuch as the rod 38 is free to slide vertically through the bearing 37. Due to the resiliency of the spring 26, the free movement about the ball and socket joint 32—33 and the comparatively horizontal immobility of the bearing joint 37—38, the towing stress is borne almost entirely by the coupling part 36—37—38. Inasmuch as the pneumatic tube 36 is resilient the shocks encountered in a horizontal direction are cushioned thereby. It is also clear that in turning, the pivoting between the two vehicles must be around the axis of the bearing 37 which is directly over the rear axle of the towing vehicle 11.

Figure 5:
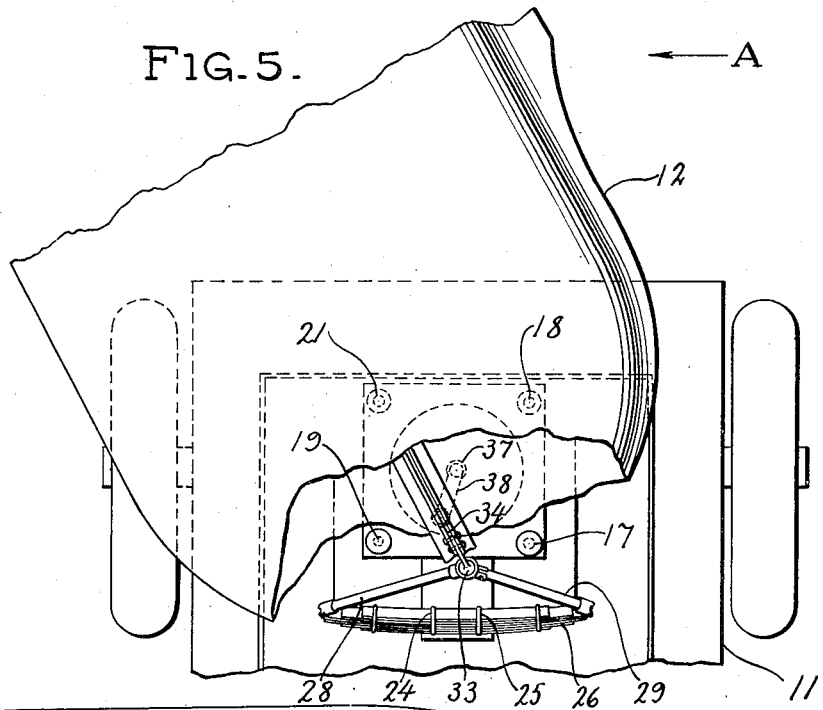
Fig. 5 is a plan view of a portion of a device showing the parts in the same position as illustrated in Fig. 4.
Figure 4:
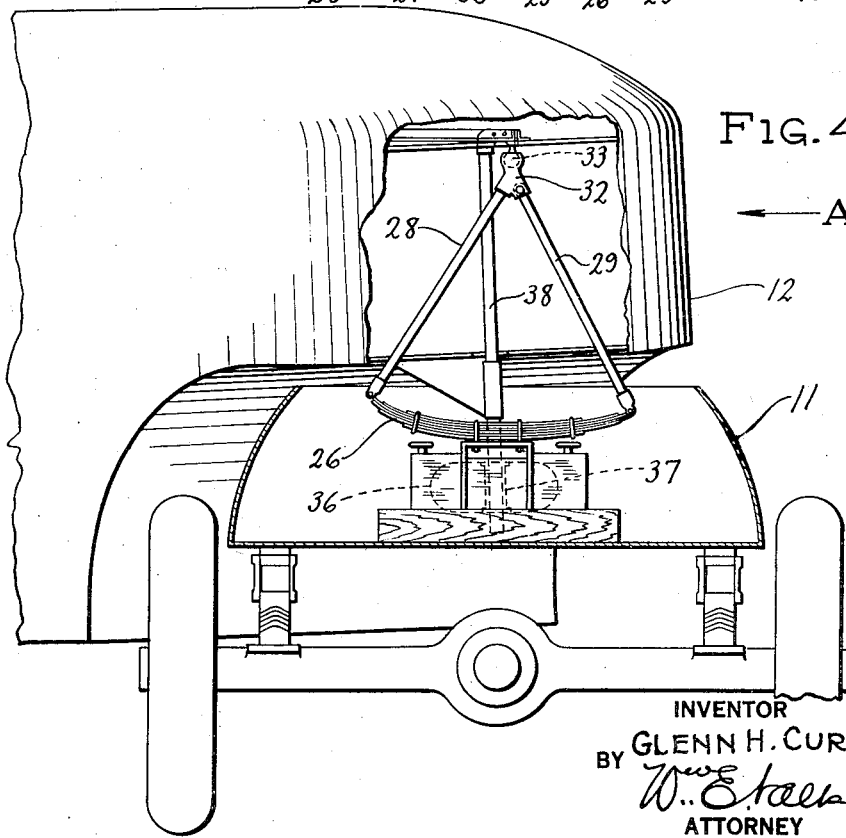
Fig. 4 is a section similar to Fig. 3 with the parts in different position to illustrate the position thereof when the unit is turning.

As may be seen in Figs. 4 and 5, when the unit begins to turn, the vehicles pivot about the axis of the bearing 37, and the struts 28 and 29 and the spring 26, are twisted from their normal symmetrical position so that the ball and socket joint 32—33 is moved away from the direction of the turn. However, at the same time that the leaf spring 26 is being distorted it offers a certain amount of resistance to such distortion and inasmuch as the tube 36 is also resilient, the rod 38 and the bearing 37 are also moved from their original position, the bearing 37 is thus moved from the vertical position and its upper end inclined toward the turn. This also moves the upper part of the trailer vehicle toward the turn and inasmuch as the rear wheels of the trailer vehicle are held against lateral movement by the traction of the road the trailer vehicle is tipped as shown in Figs. 4 and 5 in the direction of the turn, i. e., in the direction of the arrows A in said figures, so that the trailer vehicle is thus banked properly to withstand any tendency to overturn due to centrifugal motion at the turn.

It is thought that the operation of the caster unit will be clear from the above description of the parts. However, it is to be noted that by means of the combined caster and jack built in the body, it is possible for one man to easily uncouple and put the trailer car away in a restricted space. To do this, it is only necessary to put on the handle 52, screw in the screw 44 until the caster 51 contacts with the ground and thus raise the trailer from its support on the towing car. Then the screws such as 17, 18, 19 and 21 may be unfastened from the towing car and the whole coupling unit, together with the trailer vehicle, removed easily therefrom.

The term or expression "towing car" as used in the claims is intended to include any and all forms of power vehicles. The term "trailer", likewise used in the claims is intended to include or embrace semi-trailers as well.

It is to be understood that the above described embodiment of the invention is for the purpose of illustration only and various changes may be made therein without departing from the spirit and scope of the invention.

I claim as my invention:

1. A coupling unit for a combined trailer and towing car combination adapted to fasten the trailer to the towing car, comprising a block fastened to said towing car, a frame supported by said block, means for removably securing said frame to said block, a forward projection formed on said frame, a laterally extending and horizontally placed leaf spring fastened to said forward projection, a pair of struts, one pivoted at each end of said spring, a fitting fastened to the upper end of one of the struts and pivotally secured to the upper end of the other strut, a socket formed in said fitting, a ball adapted to form a ball and socket joint with said socket and secured to said trailer, a substantially vertical rod, means for securing said rod to said ball and to said trailer, a substantially vertical bearing in which said rod slides, and a pneumatic tube positioned in and supported by said frame and carrying said vertical bearing.

2. A coupling for joining a towing car to a trailer comprising a laterally extending spring, a pair of struts pivotally fastened, one to each end of the spring and extending upward to a mutual pivot, a ball and socket joint carried adjacent to said last named pivot, a vertically slidable rod fastened to said trailer vehicle and connected to said ball and socket joint, a substantially vertical bearing through which said rod slides and means for connecting all of said coupling structure to said towing car and for disconnecting said structure therefrom whereby said coupling structure may be removed with said trailer vehicle.

3. A coupling for joining a towing car to a trailer comprising a laterally extending spring, a pair of struts pivotally fastened, one to each end of the spring and extending upward to a mutual pivot, a ball and socket joint carried adjacent to said last named pivot, a vertically slidable rod fastened to said trailer vehicle and connected to said ball and socket joint, a substantially vertical bearing through which said rod slides, and means for fastening said bearing and said leaf spring to said towing car.

4. A coupling for connecting two vehicles for tractor-trailer operation which comprises, a universal swivel connection between said vehicles and a second connection between said vehicles including a universal swivel positioned above and forward of said first connection.

5. A coupling for connecting two vehicles for tractor-trailer operation which comprises, a universal swivel connection between said vehicles, a second connection between said vehicles including a universal swivel positioned above and forward of said first connection, both of said connections being normally positioned in a vertical plane passing longitudinally through the center of the vehicles and means resiliently restraining movement of said second swivel from such vertical plane.

6. A coupling for connecting two vehicles for tractor-trailer operation which comprises, a universal swivel connection between said vehicles, a second connection between said vehicles including an elongated member resiliently connected at one end to the tractor vehicle forwardly of said first connection and connected at the other end by means of a universal swivel to the trailer vehicle at a point above and forward of said first connection, all of said points of connection being normally positioned in a vertical plane passing longitudinally through the tractor vehicle.

7. A coupling as in claim 5 wherein said elongated member is in the form of an isosceles triangle having its base in the form of a leaf spring positioned transversely of the tractor vehicle and connected thereto at the center of the spring, the elevated universal swivel connection of said member to the trailer vehicle being at the apex of the triangle.

8. A coupling for connecting a tractor vehicle to a trailer which comprises, a resilient universal, swivel connection adapted to sustain the draft action between the vehicles, and a second connection between said vehicles including a member resiliently secured to the tractor forwardly of said first connections and secured to the trailer by a universal swivel positioned above and forward of said first connection, the load imposed on the tractor by the trailer being supported by said second connection.

9. An articulated vehicular combination comprising a tractor vehicle and a trailer vehicle means including a coupling for connecting the vehicles together for relative angular movement about an axis upwardly inclined in the direction of normal travel of the vehicles.

GLENN H. CURTISS.